(12) United States Patent
Ishida et al.

(10) Patent No.: US 9,667,835 B2
(45) Date of Patent: May 30, 2017

(54) IMAGE FORMING APPARATUS AND IMAGE FORMING SYSTEM INCLUDING THE IMAGE FORMING APPARATUS

(71) Applicants: Masahiro Ishida, Kanagawa (JP); Naoki Matsuda, Kanagawa (JP)

(72) Inventors: Masahiro Ishida, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/943,543

(22) Filed: Nov. 17, 2015

(65) Prior Publication Data
US 2016/0142586 A1 May 19, 2016

(30) Foreign Application Priority Data
Nov. 17, 2014 (JP) .................... 2014-232405

(51) Int. Cl.
| | |
|---|---|
| *H04N 1/58* | (2006.01) |
| *G06K 15/14* | (2006.01) |
| *G06K 15/16* | (2006.01) |
| *H04N 1/00* | (2006.01) |

(52) U.S. Cl.
CPC .............. *H04N 1/58* (2013.01); *G06K 15/14* (2013.01); *G06K 15/16* (2013.01); *H04N 1/0032* (2013.01); *H04N 1/00822* (2013.01); *H04N 1/00976* (2013.01); *H04N 2201/0094* (2013.01)

(58) Field of Classification Search
None
See application file for complete search history.

(56) References Cited

U.S. PATENT DOCUMENTS

| | | |
|---|---|---|
| 2011/0170892 A1 | 7/2011 | Ishida et al. |
| 2015/0234333 A1 | 8/2015 | Yasuda et al. |

FOREIGN PATENT DOCUMENTS

| | | | |
|---|---|---|---|
| JP | 9-281877 | | 10/1997 |
| JP | 2001341898 A | * | 12/2001 |
| JP | 2008-024390 | | 2/2008 |
| JP | 2008024390 A | * | 2/2008 |
| JP | 2015-152760 | | 8/2015 |

* cited by examiner

*Primary Examiner* — Thomas D Lee
(74) *Attorney, Agent, or Firm* — Harness, Dickey & Pierce, P.L.C.

(57) ABSTRACT

An image forming system includes an image forming apparatus that includes an image forming part to form an image on a recording medium, a sheet container to contain the recording medium, a sheet feeder to feed the recording medium from the sheet container toward the image forming part, and a controller to switch speeds of conveyance of the recording medium conveyed by the image forming part and the sheet feeder between high speed sheet conveyance and low speed sheet conveyance. The image forming apparatus continuously forms the image on multiple recording media in a continuous printing mode. The controller adjusts a printing distance in the continuous printing mode between a trailing end of a preceding recording medium of the recording media and a leading end of a subsequent recording medium in the low speed sheet conveyance to be greater than the printing distance in the high speed sheet conveyance.

15 Claims, 9 Drawing Sheets

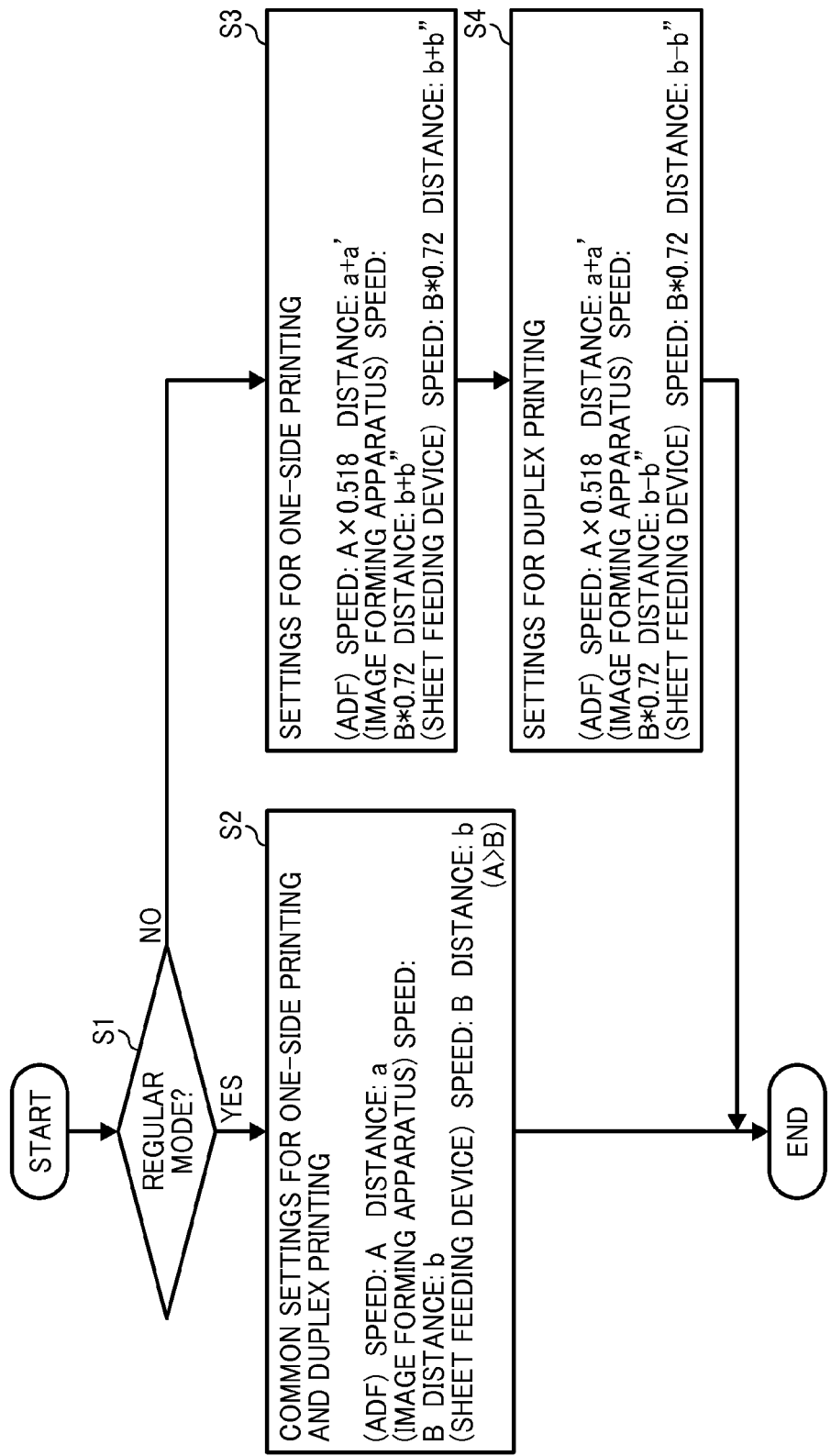

IMAGE FORMING APPARATUS AND IMAGE FORMING SYSTEM INCLUDING THE IMAGE FORMING APPARATUS

CROSS-REFERENCE TO RELATED APPLICATION

This patent application is based on and claims priority pursuant to 35 U.S.C. §119(a) to Japanese Patent Application No. 2014-232405, filed on Nov. 17, 2014, in the Japan Patent Office, the entire disclosure of which is hereby incorporated by reference herein.

BACKGROUND

Technical Field

This disclosure relates to an image forming apparatus and an image forming system including the image forming apparatus.

Related Art

Known image forming apparatuses convey a recording sheet by switching a speed of conveyance of the recording sheet between high speed conveyance and low speed conveyance. For example, a known technique of an image forming apparatus reduces occurrence of noise by conveying the recording sheet in the low speed conveyance in a silent mode when compared to a regular mode.

SUMMARY

At least one aspect of this disclosure provides an image forming system including an image forming apparatus that includes an image forming part to form an image on a recording medium, a sheet container to contain the recording medium, a sheet feeder to feed the recording medium from the sheet container toward the image forming part, and a controller to switch speeds of conveyance of the recording medium conveyed by the image forming part and the sheet feeder between high speed sheet conveyance and low speed sheet conveyance. The image forming apparatus continuously forms the image on multiple recording media in a continuous printing mode. The controller adjusts a printing distance in the continuous printing mode between a trailing end of a preceding recording medium of the recording media and a leading end of a subsequent recording medium in the low speed sheet conveyance to be greater than the printing distance in the high speed sheet conveyance.

Further, at least one aspect of this disclosure provides an image forming apparatus including an image forming part to form an image on a recording medium, a sheet container to contain the recording medium, a sheet feeder to feed the recording medium from the sheet container toward the image forming part, and a controller to switch speeds of conveyance of the recording medium conveyed by the image forming part and the sheet feeder between high speed sheet conveyance and low speed sheet conveyance. The image forming apparatus continuously forms the image on multiple recording media in a continuous printing mode. The controller adjusts a printing distance in the continuous printing mode between a trailing end of a preceding recording medium of the recording media and a leading end of a subsequent recording medium in the low speed sheet conveyance to be greater than the printing distance in the high speed sheet conveyance.

BRIEF DESCRIPTION OF THE SEVERAL VIEWS OF THE DRAWINGS

FIG. 10 is a flowchart of a series of setting operations performed by the main controller of the image forming system and the controller.

DETAILED DESCRIPTION

Figure 1:
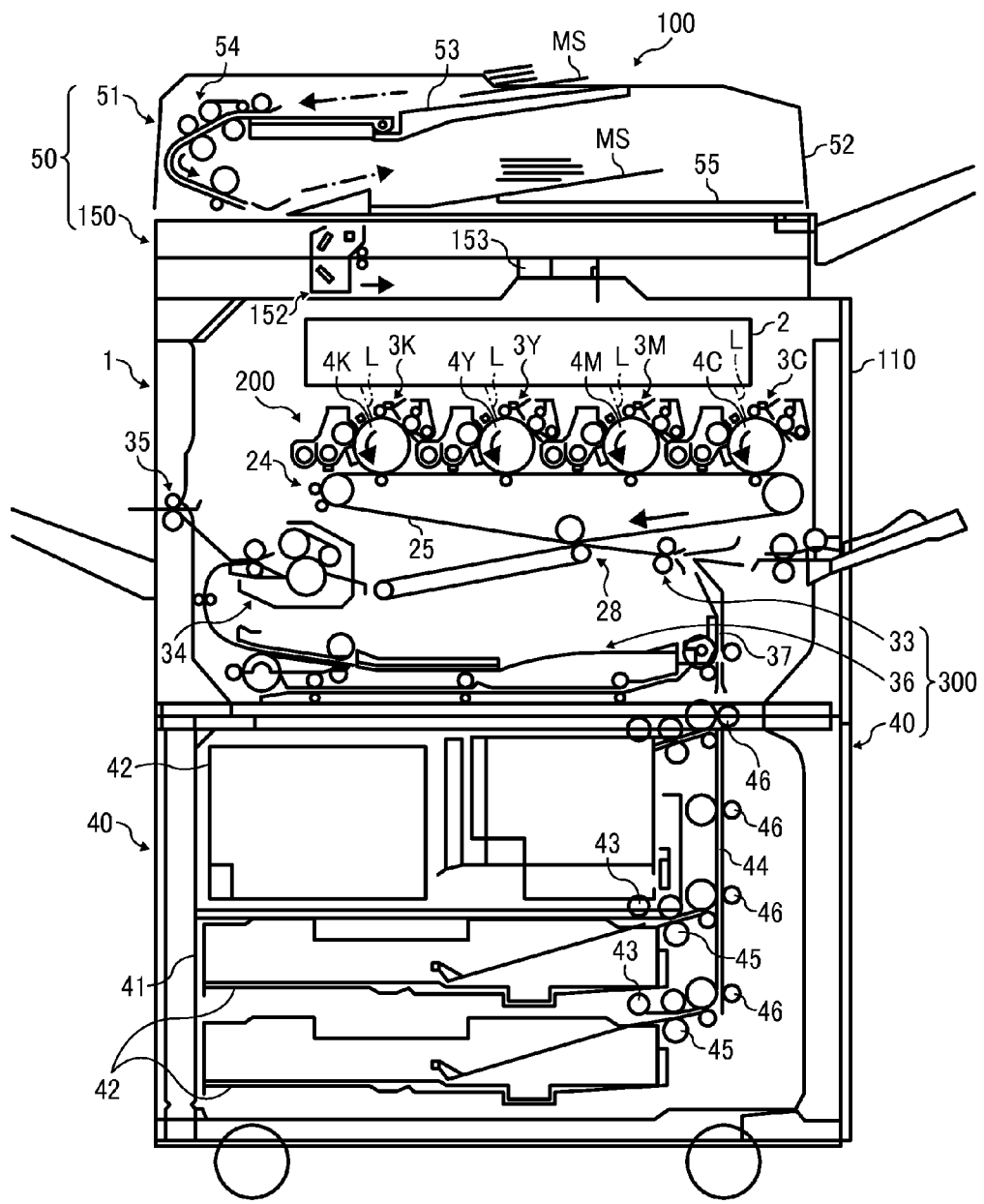
FIG. 1 is a diagram illustrating a schematic configuration of an image forming system according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of a basic configuration of an image forming system 100 according to an example of this disclosure, with reference to FIG. 1.

FIG. 1 is a schematic diagram of the basic configuration of the image forming system 100 according to the present example. The image forming system 100 includes an image forming apparatus 1, a sheet feeding device 40, and a document conveying and reading device 50.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present embodiment, the image forming apparatus 1 is an electrophotographic color copier that forms color and monochrome toner images on recording media by electrophotography.

It is to be noted in the following examples that: the term "image forming apparatus" indicates an apparatus in which an image is formed on a recording medium such as paper, OHP (overhead projector) transparencies, OHP film sheet P, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

The document conveying and reading device 50 includes a scanner 150 and an automatic document feeder (hereinafter referred to as ADF) 51. The scanner 150 functions as a document reading unit fixedly mounted on the image forming apparatus 1. The ADF 51 that functions as a document conveying unit is supported by the scanner 150.

As illustrated in FIG. 1, the sheet feeding device 40 includes a paper bank 41, two sheet trays 42 disposed vertically in the paper bank 41, sheet feed rollers 43 each provided to a corresponding sheet tray 42 to feed a recording sheet functioning as a sheet member therefrom, a sheet feeding path 44 along which the recording sheet is fed and conveyed, separation rollers 45 each provided in the vicinity of a corresponding sheet tray 42 to separate the fed recording sheets one by one and feed the separated recording sheet to the sheet feeding path 44, and multiple conveying roller pairs 46 to convey the recording sheet toward a sheet conveying path 37 of the image forming apparatus 1. Each sheet tray 42 accommodates a bundle of multiple recording sheets therein. Each of the sheet feed rollers 43 contacts to press an uppermost recording sheet in the sheet tray 42. As the corresponding sheet feed roller 43 rotates, the uppermost recording sheet is fed from the sheet tray 42. Then, the recording sheet accommodated in the sheet tray 42 is fed and conveyed to the sheet conveying path 37 in the image forming apparatus 1.

Figure 2:
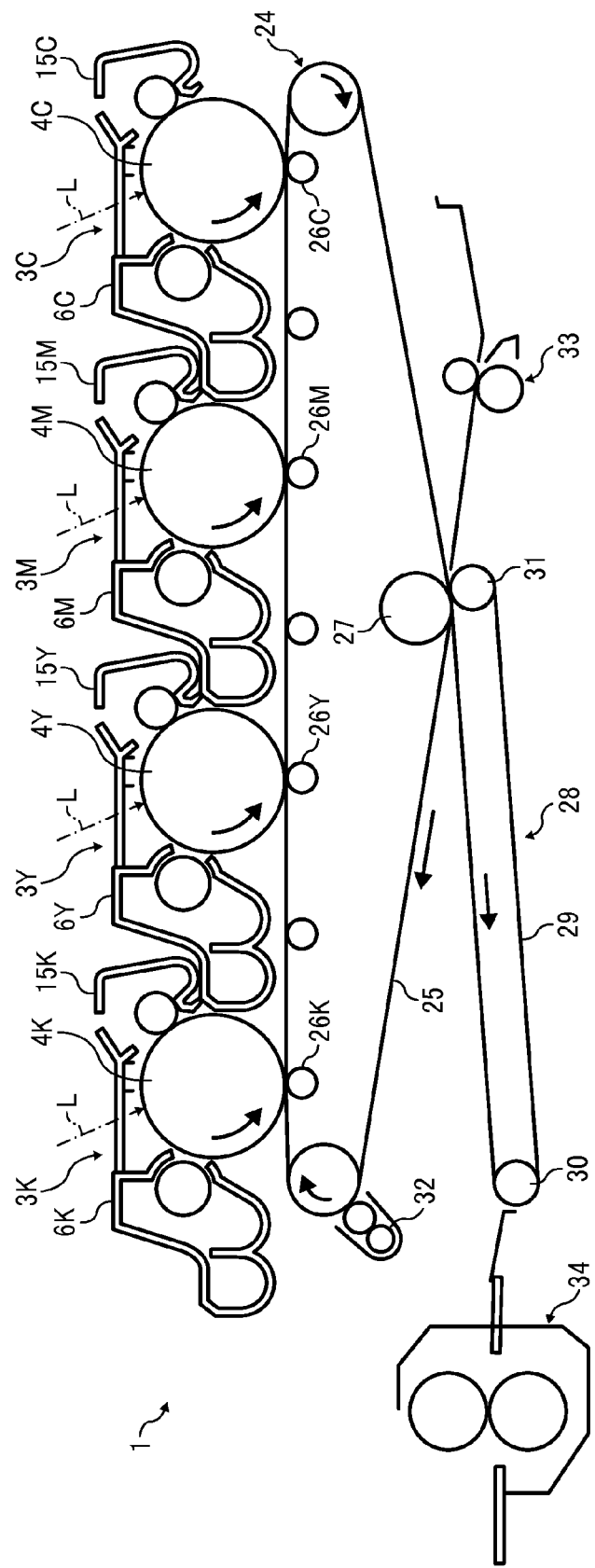
FIG. 2 is an enlarged diagram illustrating a part of an internal configuration of an image forming apparatus of the image forming system of FIG. 1.

FIG. 2 is an enlarged view illustrating part of an internal configuration of the image forming apparatus 1.

The image forming apparatus 1 includes an optical writing unit 2, four image forming units 3K, 3Y, 3M, and 3C, a transfer unit 24, a sheet conveying unit 28, a registration roller pair 33, a fixing device 34, a switchback unit 36, and the sheet conveying path 37.

The image forming units 3K, 3Y, 3M, and 3C form black, yellow, magenta, and cyan images, respectively.

The optical writing unit 2 includes a light source such as a laser diode and an LED. By driving the light source in the optical writing unit 2, laser light beams L are emitted toward four drum-shaped photoconductors 4K, 4Y, 4M, and 4C to irradiate respective surfaces of the drum-shaped photoconductors 4K, 4Y, 4M, and 4C. Consequently, electrostatic latent images of respective single colors are formed on the surfaces of the photoconductors 4K, 4Y, 4M, and 4C, which will be developed to visible toner images via a given development process.

Next, a description is given of a part of the configuration of the image forming apparatus 1 included in the image forming system 100.

Each of the image forming units 3K, 3Y, 3M, and 3C functions as a single supporting unit in a common form to include each photoconductor 4 (which are the photoconductors 4K, 4Y, 4M, and 4C) and units and components disposed around the photoconductor 4. The image forming units 3K, 3Y, 3M, and 3C are detachably attached to a body of the image forming system 100.

It is to be noted that, the units and components included in the image forming apparatus 1 of the image forming system 100 are hereinafter referred to in a singular unit occasionally without suffix indicating toner colors. For example, the image forming units 3K, 3Y, 3M, and 3C may also be referred to as "the image forming unit 3".

For example, the image forming unit 3 includes a photoconductor 4, a developing device 6 to develop an electrostatic latent image formed in the surface of the photoconductor 4 into a visible toner image, and a drum cleaning device 15 to remove residual toner adhered to the surface of the photoconductor 4 after the toner image has passed a primary transfer nip region.

The image forming system 100 has a tandem-type configuration in which the four image forming units 3K, 3Y, 3M, and 3C are disposed facing an intermediate transfer belt 25 having an endless loop along a direction of movement of the intermediate transfer belt 25.

Figure 3:
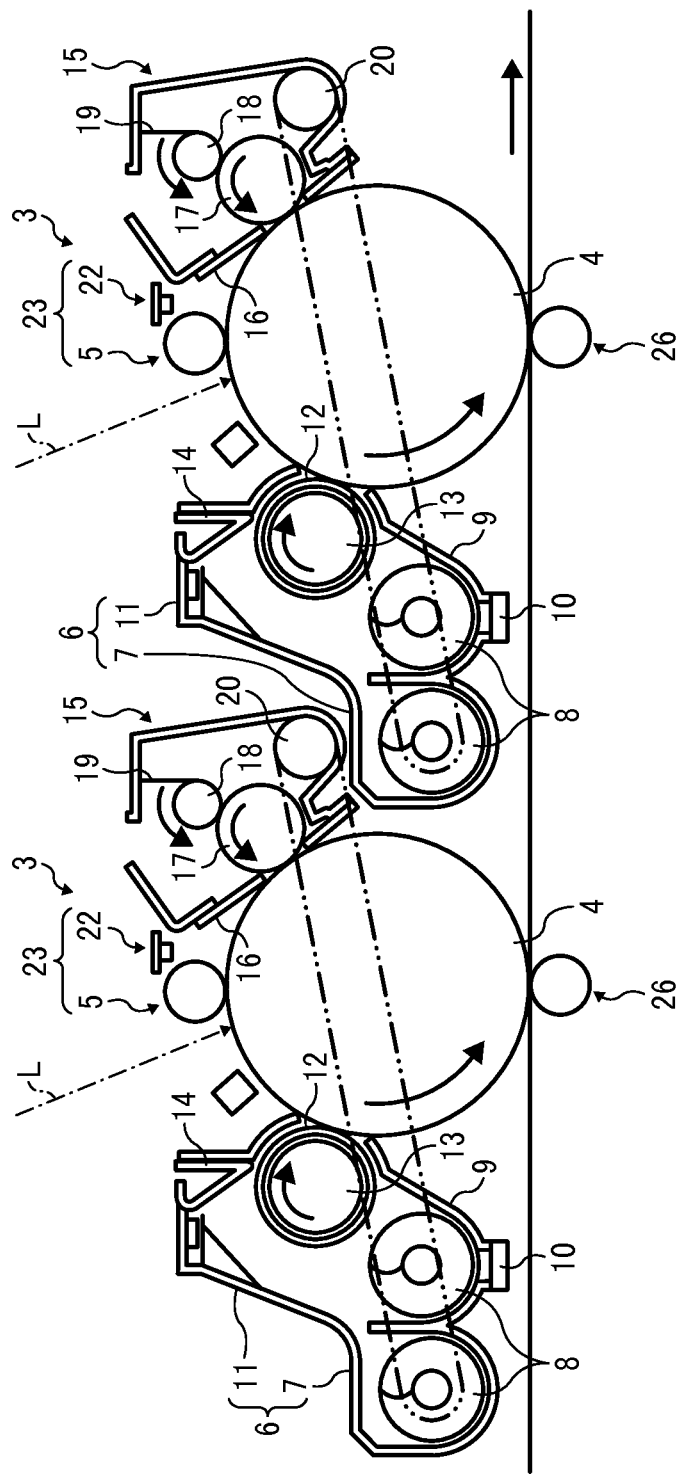
FIG. 3 is an enlarged view illustrating a part of a tandem-type configuration constructed by four image forming units in the image forming apparatus of FIG. 2.

FIG. 3 is an enlarged view illustrating part of a tandem-type configuration including the four image forming units 3K, 3Y, 3M, and 3C.

It is to be noted that the image forming units 3Y, 3M, 3C, and 3K employ different single color toners, which are black (K), yellow (Y), magenta (M), and cyan (C) toners.

Except for the colors of toners, the image forming units 3Y, 3M, 3C, and 3K have configurations identical to each other. Accordingly, FIG. 3 does not show any suffix indicating the difference of the toner colors.

As illustrated in FIG. 3, the image forming unit 3 includes the photoconductor 4 and image forming units such as a charging device 23 that functions as a charger, the developing device 6, the drum cleaning device 15, and an electric discharging lamp 22 disposed around the photoconductor 4. The photoconductor 4 has a drum-shaped body with a photoconductive layer coated with organic photoconductor material over an aluminum elementary tube or the like. Alternately, the photoconductor 4 may have an endless belt body.

The developing device 6 employs two-component developer that includes magnetic carriers and non-magnetic toner. By using the two-component developer, the developing device 6 develops an electrophotographic latent image into a visible toner image. Hereinafter, the two-component developer is also referred to as an unit developer.

The developing device 6 includes an agitating section 7 and a development section 11. The agitating section 7 agitates the unit developer accommodated therein and conveys the unit developer to a development sleeve 12. The development section 11 supplies the non-magnetic toner included in the unit developer and held by the development sleeve 12 to the photoconductor 4.

The agitating section 7 is located at a position lower than the development section 11 and includes two transfer screws 8, a partition, a development case 9, and a toner density sensor 10. The two transfer screws 8 are disposed in parallel to each other. The partition is disposed between the transfer screws 8. The development case 9 has an opening or a slot to face the photoconductor 4. The toner density sensor 10 is disposed on the bottom of the development case 9.

The development section 11 includes the development sleeve 12, a magnetic roller 13, and a doctor blade 14. The development sleeve 12 faces the photoconductor 4 through the opening (or the slot) of the development case 9. The magnetic roller 13 is fixedly or unrotatably disposed inside the development sleeve 12. The doctor blade 14 is disposed adjacent to the development sleeve 12 with the leading edge thereof not being in contact with the development sleeve 12.

The development sleeve 12 has a non-magnetic, rotatable tubular body. The magnetic roller 13 has multiple magnetic poles arranged in the order in a rotation direction of the development sleeve 12, starting from an opposed position to the doctor blade 14. Each of these magnetic poles applies a magnetic force at a given position in the rotation direction of the development sleeve 12, with respect to the unit developer held on the development sleeve 12. With this action of the magnetic roller 13, the unit developer that is conveyed from the agitating section 7 is attracted to the surface of the development sleeve 12 so as to be attached thereto and to form a magnetic brush of toner along the lines of the magnetic force on the surface of the development sleeve 12.

In accordance with rotation of the development sleeve 12, the magnetic brush is regulated to have an appropriate layer thickness when passing by the opposed position to the doctor blade 14. Then, the magnetic brush is moved to a development region facing the photoconductor 4. Due to a difference of potentials between a development bias that is applied to the development sleeve 12 and an electrostatic latent image formed on the surface of the photoconductor 4, the toner is transferred onto the electrostatic latent image so that the electrostatic latent image is developed to a visible toner image.

Further, in accordance with rotation of the development sleeve 12, the magnetic brush is returned to the development section 11. After leaving from the surface of the development sleeve 12 due to repulsion of the magnetic field formed between the magnetic poles of the magnetic roller 13, the magnetic brush is returned to the agitating section 7. An appropriate amount of toner is supplied to the two-component developer in the agitating section 7 based on a result or results detected by the toner density sensor 10.

It is to be noted that, alternative to the two-component developer, the developing device 6 according to the present example may employ one-component developer that does not include magnetic carriers.

The drum cleaning device 15 includes a cleaning blade 16, a fur brush 17, an electric field roller 18, a scraper 19, and a collection screw 20.

The cleaning blade 16 is an elastic member of polyurethane rubber to be pressed against the photoconductor 4, so as to scrape residual toner remaining on the surface of the photoconductor 4. In the present example, the drum cleaning device 15 employs a blade member such as the cleaning blade 16, however, the configuration is not limited thereto. Alternative to the blade member, a brush roller, for example, can be applied to the drum cleaning device 15.

The fur brush 17 is provided in order to increase cleanability. The fur brush 17 is a conductive member to slidably contact the photoconductor 4 and is rotatable in a direction indicated by arrow in FIG. 3. Specifically, an outer circumferential surface of the fur brush 17 contacts the surface of the photoconductor 4. The fur brush 17 also functions as an applier that scrapes a solid lubricant to obtain fine powder of lubricant and applies the fine powder to the surface of the photoconductor 4.

The electric field roller 18 is a metallic member that applies a bias to the fur brush 17. The electric field roller 18 is rotatably disposed in a direction indicated by arrow in FIG. 3.

The scraper 19 has a leading edge that is pressed against the electric field roller 18.

The toner attached to the fur brush 17 is transferred onto the electric field roller 18 that contacts the fur brush 17 in a counter direction to be applied with a bias while the electric field roller 18 is rotating. After being scraped and removed from the electric field roller 18 by the scraper 19, the toner falls onto the collection screw 20.

The collection screw 20 conveys the collected toner toward an edge portion of the drum cleaning device 15 in a direction perpendicular to a sheet of the drawings and transfers the collected toner to an outside recycle transfer unit. The outside recycle toner unit transfers the collected toner to the developing device 6 for recycling or reusing.

The electric discharging lamp 22 removes residual electric charge remaining on the surface of the photoconductor 4 by photo irradiation. Thereafter, the electrically discharged surface of the photoconductor 4 is uniformly charged by the charging device 23 again and then optically irradiated by the optical writing unit 2.

It is to be noted that the charging device 23 is a charging roller to apply a charge bias to the surface of the photoconductor 4 while rotating and contacting the photoconductor 4. The charging device 23 may be a scorotron charger that charges the photoconductor 4 without contacting the photoconductor 4.

By performing the above-described operations with the configuration illustrated in FIG. 2, black (K), yellow (Y), magenta (M), and cyan (C) toner images are formed on the photoconductors 4K, 4Y, 4M, and 4C of the image forming units 3K, 3Y, 3M, and 3C, respectively.

The transfer unit 24 is disposed below the image forming units 3K, 3Y, 3M, and 3C. The transfer unit 24 functions as a belt drive unit to cause the intermediate transfer belt 25 that is wound with tension by multiple rollers to move endlessly in a clockwise direction in FIG. 2 while the intermediate transfer belt 25 is contacting the photoconductors 4K, 4Y, 4M, and 4C. By so doing, respective primary transfer nip areas are formed between the photoconductors 4K, 4Y, 4M, and 4C and the intermediate transfer belt 25 that has an endless loop.

Primary transfer rollers 26K, 26Y, 26M, and 26C disposed in contact with an inner loop of the intermediate transfer belt 25 press the intermediate transfer belt 25 against the photoconductors 4K, 4Y, 4M, and 4C.

A power source applies the primary transfer bias to the primary transfer rollers 26K, 26Y, 26M, and 26C. With this action, respective primary electric fields are formed in the respective primary transfer nip areas for black, yellow, magenta, and cyan toner images so that the black, yellow, magenta, and cyan toner images formed on the photoconductors 4K, 4Y, 4M, and 4C, respectively, are electrostatically transferred onto the intermediate transfer belt 25.

Along with the endless movement of the intermediate transfer belt 25 in the clockwise direction in FIG. 2, the intermediate transfer belt 25 passes through the primary transfer nip areas for the black, yellow, magenta, and cyan toner images sequentially. At the primary transfer nip areas, the toner images are sequentially transferred and overlaid onto the front surface of the intermediate transfer belt 25 for primary transfer. Due to the primary transfer of the toner images, a four-color composite toner image (hereinafter referred to as a four-color toner image) is formed on the front surface of the intermediate transfer belt 25.

The sheet conveying unit 28 is disposed below the transfer unit 24. The sheet conveying unit 28 includes a sheet transfer belt 29, a drive roller 30, and a secondary transfer roller 31. The sheet transfer belt 29 is an endless belt that is wound around the drive roller 30 and the secondary transfer roller 31. The intermediate transfer belt 25 and the sheet transfer belt 29 are sandwiched between the secondary transfer roller 31 and the lower tension roller 27 of the transfer unit 24. With this configuration, a secondary transfer nip area in which the front surface of the intermediate transfer belt 25 and the front surface of the sheet transfer belt 29 are in contact with each other is formed.

The lower tension roller 27 of the transfer unit 24 is applied with a secondary transfer bias by a power source. By contrast, the secondary transfer roller 31 of the sheet conveying unit 28 is grounded. As a result, a secondary transfer electric field is formed in the secondary transfer nip area.

The registration roller pair 33 is disposed on a right side of the second transfer nip area in FIG. 2. A registration roller sensor is disposed adjacent to an entrance of the registration nip area of the registration roller pair 33. The recording sheet functioning as a sheet member is conveyed from the sheet feeding device 40 toward the registration roller pair 33. After a given time has elapsed since detection of the leading edge of the recording sheet by the registration roller sensor, the recording sheet is stopped and the leading edge thereof abuts against the registration nip area of the registration roller pair 33.

After the leading edge of the recording sheet contacts the registration nip area of the registration roller pair 33, the registration roller pair 33 restarts the rotation to synchronize movement of the recording sheet with movement of the four-color toner image formed on the intermediate transfer belt 25, so that the recording sheet is conveyed to the secondary transfer nip area.

In the secondary transfer nip area, the four-color toner image formed on the intermediate transfer belt 25 contacts the recording sheet. Due to action of the secondary transfer electric field and a nip pressure in the secondary transfer nip area, the four-color toner image is secondarily transferred onto the recording sheet. By being mixed with a white color of a surface of the recording sheet, the four-color toner image is developed to a full-color toner image.

After passing through the secondary transfer nip area, the recording sheet having the full-color toner image on the surface thereof is stripped or separated from the intermediate transfer belt 25. Then, while being held on the front surface of the sheet transfer belt 29, the recording sheet is conveyed to the fixing device 34 along with endless rotation of the sheet transfer belt 29.

After the secondary transfer of the toner image from the intermediate transfer belt 25 onto the recording sheet in the secondary transfer nip area, residual toner remains on the surface of the intermediate transfer belt 25. The residual toner is scraped and removed from the surface of the intermediate transfer belt 25 by a belt cleaning device 32 that is disposed in contact with the outer surface of the intermediate transfer belt 25.

The fixing device 34 fixes the full-color toner image to the recording sheet by application of heat and pressure therein. Then, the recording sheet having the fixed toner image thereon is conveyed from the fixing device 34 to a sheet discharging roller pair 35 to be discharged out of the body of the image forming apparatus 1.

In FIG. 1, the switchback unit 36 that functions as a re-conveying unit is disposed below the sheet conveying unit 28 and the fixing device 34. After a full-color toner image is fixed to one side or a front surface of the recording sheet, a separator is moved to select a direction of conveyance of the recording sheet. Specifically, the direction of conveyance of the recording sheet is selected from one of a path to the sheet discharging roller pair 35 and a path to the switchback unit 36 that functions as a re-conveying unit. When the recording sheet is conveyed to the switchback unit 36, the recording sheet is reversed to enter the secondary transfer nip area of the image forming apparatus 1 again. There, a toner image is secondarily transferred onto the other side or a back surface of the recording sheet, then is fixed to the recording sheet, and is discharged via the sheet discharging roller pair 35 to a sheet discharging tray.

The scanner 150 that is fixed onto the image forming apparatus 1 includes a fixed scanning unit and a movable scanning unit 152 that functions as a moving irradiation unit.

The movable scanning unit 152 is disposed immediately below a second contact glass 155 (see FIG. 4) that is fixed to an upper wall of a casing of the scanner 150 so as to contact an original document MS. The movable scanning unit 152 includes a light source and optical image forming units such as multiple reflection mirrors. The movable scanning unit 152 moves in a sub scanning direction that is a left and right direction in FIG. 1. As the movable scanning unit 152 moves from the left side to the right side in FIG. 1, light emitted from the light source is reflected by the original document MS placed on the second contact glass 155. Thereafter, the reflected light travels via the multiple reflection mirrors to be received by image sensors 153 fixed to a body of the scanner 150. The image sensors 153 are also referred to as charge coupled devices (CCDs) 153.

Figure 5:
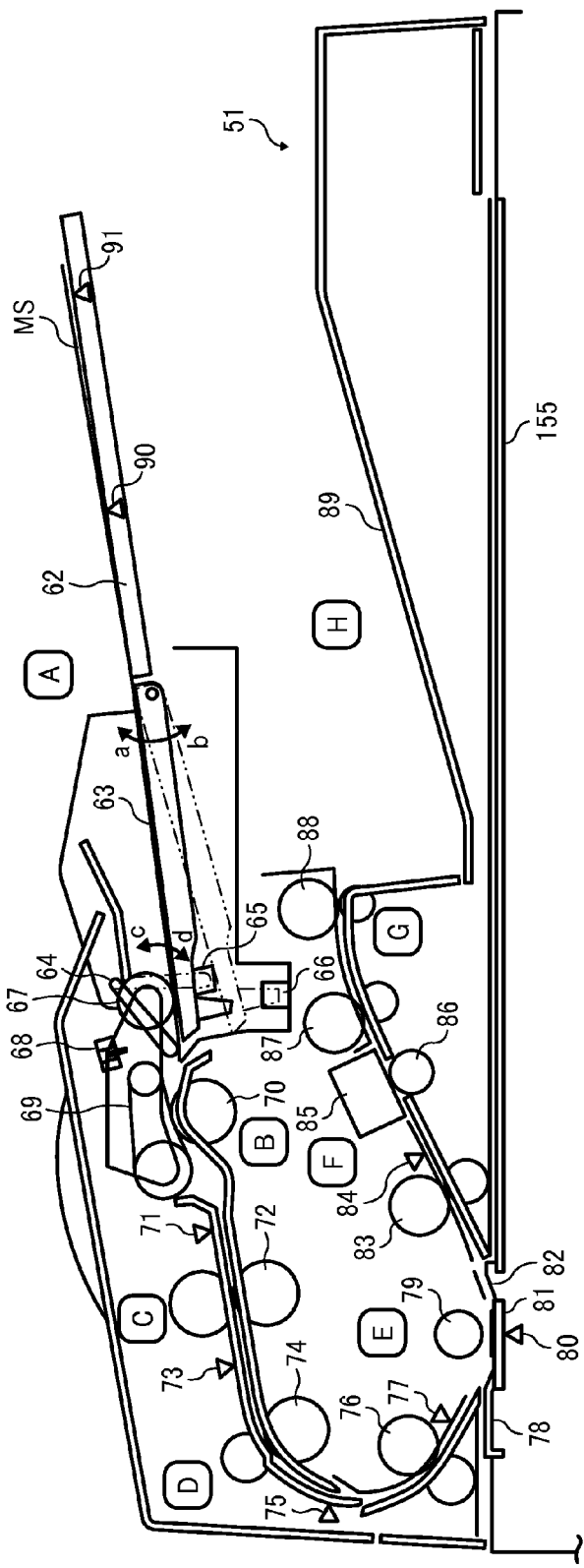
FIG. 5 is a diagram illustrating a schematic configuration of an automatic document feeder (ADF) of the image reading unit of FIG. 4.

By contrast, the fixed scanning unit includes a first fixed scanning part E (see FIG. 5) and a second fixed scanning part F (see FIG. 5). The first fixed scanning part E is disposed inside the scanner 150 and the second fixed scanning part F is disposed inside the ADF 51.

The first fixed scanning part E includes a light source, multiple reflection mirrors, and image sensors such as CCDs and is disposed immediately below a first contact glass 81 (see FIG. 4) that is fixed to the upper wall of the casing of the scanner 150. When the original document MS that is conveyed by the ADF 51 passes on or over the first contact glass 81, as light emitted from the light source is reflected by the original document MS sequentially, the reflected light is received by the image sensors via the multiple reflection mirrors. By so doing, one side or a front surface of the original document MS is scanned without moving the light source and the optical image forming units such as the multiple reflection mirrors.

Further, the second fixed scanning part F scans or reads the other side or a back surface of the original document MS after the original document MS has passed the first fixed scanning part E.

The ADF 51 that is disposed on the scanner 150 includes a body cover 52, a document loading tray 53, a document conveying unit 54, and a document stacker 55.

The body cover 52 holds and supports the document loading tray 53, the document conveying unit 54, and the document stacker 55. The document loading tray 53 loads the original document MS to be read. The document conveying unit 54 conveys the original document MS. The document stacker 55 receives and stacks the original document MS after the original document MS is read.

Figure 4:
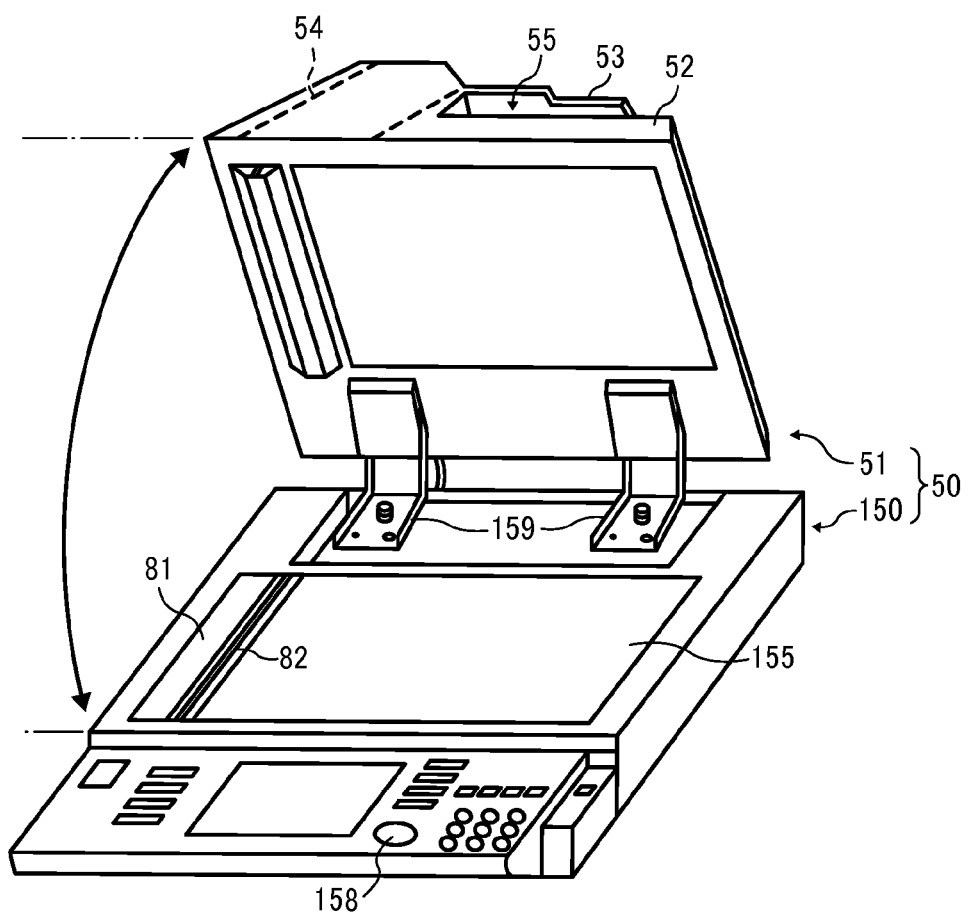
FIG. 4 is a perspective view illustrating an image reading unit of the image forming system of FIG. 1.

As illustrated in FIG. 4, hinges 159 are fixed to the scanner 150 to connect the ADF 51 and the scanner 150. With the hinges 159 attached to the scanner 150, the body cover 52 opens or closes with respect to the scanner 150 in a vertical direction. When the body cover 52 is open, the first contact glass 81 and the second contact glass 155 disposed on the upper surface of the scanner 150 are exposed. A document conveying guide 82 is disposed between the first contact glass 81 and the second contact glass 155.

When scanning a page of pages of a book or a bundle of original documents MS finished by one-side stitching such as a book binding or stitching one corner of a bundle of original documents MS, each original document MS cannot be separated from the book, and therefore cannot be fed by the ADF 51. In order to avoid this inconvenience and scan images on the book or the original documents MS, the ADF 51 is opened as illustrated in FIG. 4, the page of the book or the bundle of original documents MS is placed on the second contact glass 155 with the face down, and the ADF 51 is closed. Then, the movable scanning unit 152 of the scanner 150 (see FIG. 1) scans and reads the image on the page of the book.

By contrast, when feeding a page or pages of a bundle of original documents MS that are not bound and simply accumulated on each other, the ADF 51 separates and feeds the original documents MS one by one automatically, so that images on the separate original documents MS are sequentially read by the scanner 150. In this case, an operator or a user first sets the bundle of original documents MS on the document loading tray 53, and then presses a copy start button 158 (see FIG. 4). The first fixed scanning part E of the scanner 150 and the second fixed scanning part F of the ADF 51 read and scan the original document MS sequentially.

In this case, after the bundle of original documents MS is set on the document loading tray 53, the copy start button 158 is pressed. After the copy start button 158 is pressed, the ADF 51 causes each original document MS of the bundle loaded on the document loading tray 53 is fed to the document conveying unit 54. Then, as the original document MS is being reversed, the original document MS is conveyed to the document stacker 55.

In the process of conveyance, the original document MS is passed just above the first fixed scanning part E of the scanner 150 immediately after the original document MS is reversed. At this time, the image on the front surface of the original document MS is read by the first fixed scanning part E of the scanner 150.

Figure 6:
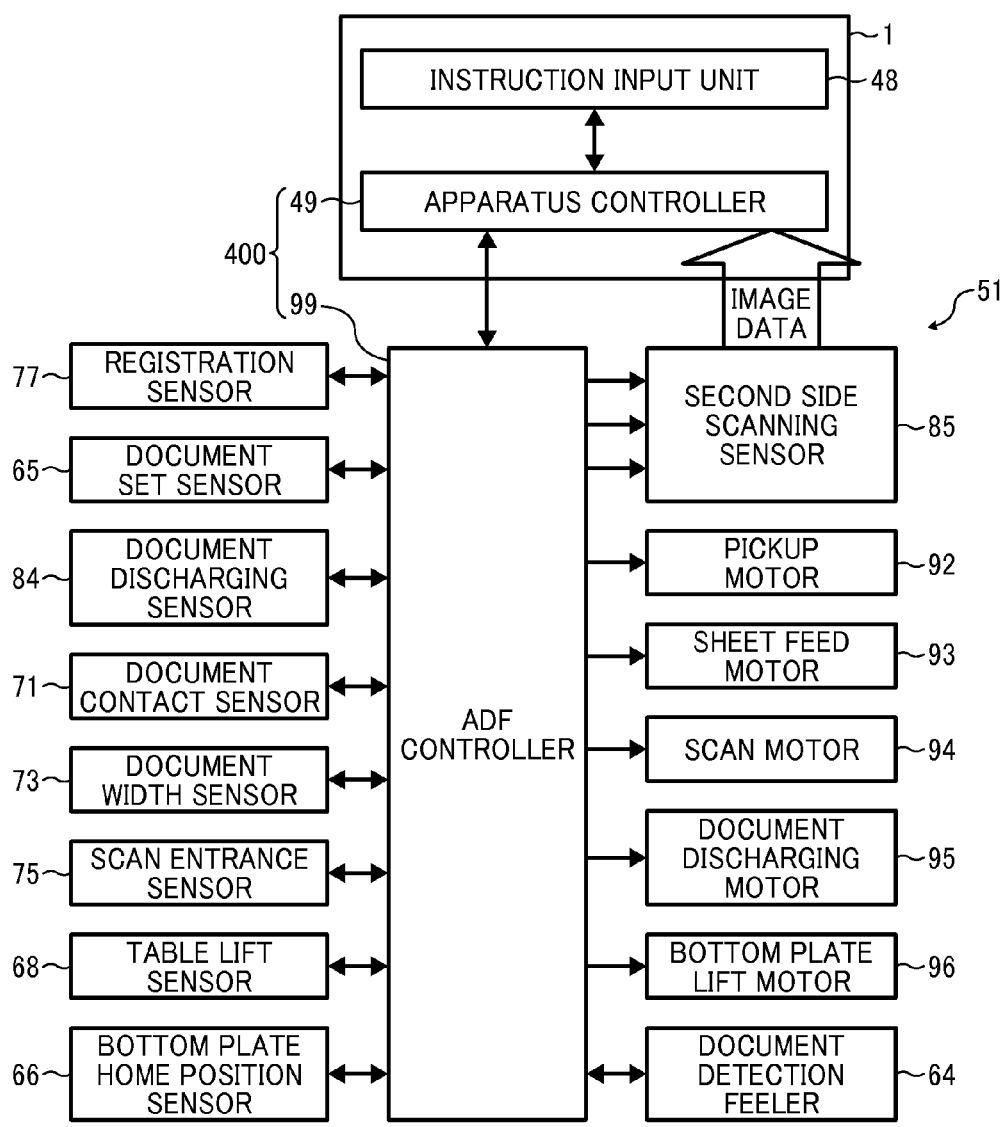
FIG. 6 is a block diagram illustrating part of electric circuit of the image forming apparatus and the ADF of the image forming system.

Next, a description is given of structure, operations, and actions of the ADF 51, with reference to FIGS. 5 and 6.

FIG. 5 is a diagram illustrating a schematic configuration of the ADF 51. FIG. 6 is a block diagram illustrating a part of electric circuit of the image forming apparatus 1 and the ADF 51.

The ADF 51 is a part of the image forming system 100 and is installed above the apparatus body 110 of the image forming system 100 such as a copier and a multifunctional (MFP) device. As illustrated in FIG. 5, the ADF 51 has various portions to process a series of document feeding operations, which are a document setting part A, a separated document feeding part B, a registration part C, a turning part D, a first fixed scanning part E, a second fixed scanning part F, a document discharging part G, a document stacking part H, a drive, and an ADF controller 99.

As illustrated in FIG. 6, the ADF controller 99 controls the ADF 51 and is electrically connected to a registration sensor 77, a document set sensor 65, a document discharging sensor 84, a contact sensor 71, a document width sensor 73, a scan entrance sensor 75, and so forth. Further, the ADF controller 99 is connected to a table lift sensor 68, a bottom plate home position sensor 66, a document conveying guide 78, a document conveying roller 79 that functions as a first side reference member, a second side scanning sensor 85 that functions as a second side reference member, a pickup motor 92, a sheet feed motor 93, a scan motor 94, a document discharging motor 95, a bottom plate lift motor 96, and a document detection feeler 64.

A bundle of original documents MS is loaded with the front surface of each original document MS placed face up on the movable original document table 63 or the original document table 62 of the document setting part A. A position of the bundle of original documents MS is adjusted by a movable side guide or guides of the document setting part An in a direction perpendicular to the document feeding direction. After the bundle of original documents MS is set correctly, the document detection feeler 64 and the document set sensor 65 detect the original document MS and transmit a document detection signal to the apparatus controller 49 of the image forming apparatus 1 (see FIG. 6) via the ADF controller 99 (see FIG. 6) and via an interface (UF).

The original document table 62 further includes document length detection sensors 90 and 91. The document length detection sensors 90 and 91 are reflective sensors or actuator-type sensors that can detect the document even if only one original document MS is set on the original document table 62, and are used to determine the length of the original document MS in the document feeding direction. In this case, the document length detection sensors 90 and 91 are located to at least determine whether a single or identical size document (e.g., A4 size) is placed in a portrait orientation or in a landscape orientation.

The movable original document table 63 can be moved by the bottom plate lift motor 96 to rotate about a fixed support in substantially vertical directions indicated by arrows "a" and "b" as illustrated in FIG. 5. When the document detection feeler 64 and the document set sensor 65 detect the original document MS and transmits the document detection signal to the ADF controller 99, the ADF controller 99 causes the bottom plate lift motor 96 to rotate in a forward direction to cause the movable original document table 63 to move upward in the direction indicated by arrow "a", so that the leading edge of the bundle of original documents MS is elevated. Eventually, the table lift sensor 68 detects an upper surface of an uppermost sheet of the bundle of original documents MS and transmits the document detection signal to the ADF controller 99. On receipt of the document detection signal transmitted from the table lift sensor 68, the ADF controller 99 causes the bottom plate lift motor 96 to rotate in a reverse direction until the table lift sensor 68 no longer transmits the document detection signal. After the bottom plate lift motor 96 has stopped the reverse rotation, the ADF controller 99 causes the bottom plate lift motor 96 to rotate in the forward direction for a given period of time, so that a pickup roller 67 contacts the uppermost sheet placed on the bundle of original documents MS.

As the pickup motor 92 drives to rotate in the forward direction or the reverse direction, the pickup roller 67 of the separated document feeding part B moves in directions indicated by arrows "c" or "d" as illustrated in FIG. 5. As the movable original document table 63 moves up, the leading edge of the bundle of original documents MS is pressed against the pickup roller 67, and therefore the pickup roller 67 is pushed up in the direction "c". When an amount of elevation of the pickup roller 67 pressed up by the bundle of original documents MS reaches a given height, the bundle of original documents MS is detected by the table lift sensor 68.

When setting the bundle of original documents MS, a user inputs instructions of either of a duplex reading mode and a one-side reading mode via an instruction input unit 48 of the image forming apparatus 1. When selecting one of the duplex reading mode and the one-side reading mode, the user can set an identical mode for the bundle of original documents MS or different modes individually to each original document MS in the bundle. For example, if 10 original documents MS are set, the user can set the duplex reading mode for the first and tenth original documents MS and the one-side reading mode for the second through ninth original documents MS.

After the reading mode is set and the copy start button 158 is pressed, the apparatus controller 48 transmits a document feed signal via the interface (UF) to the ADF controller 99 of the ADF 51.

On receipt of the document feed signal, the ADF controller 99 causes the sheet feed motor 93 to drives to rotate in the forward direction, so that the pickup roller 67 of the separated document feeding part B rotates in the forward direction. Due to this action, the pickup roller 67 picks up several documents (preferably one document) set on the document setting table 62 toward a document feeding belt 69 having an endless shape. As the sheet feed motor 93 rotates in the forward direction, the pickup roller 67 rotates in the forward direction and, at the same time, the document feeding belt 69 moves in the sheet feeding direction endlessly. Further, with this action, a driving force to rotate in the reverse direction is applied to a reverse roller 70 that is in contact with the document feeding belt 69 to form a separation nip region.

However, when the reverse roller 70 that is connected to the sheet feed motor 93 via a torque limiter directly contact with the endless document feeding belt 69 or when a single original document MS is in the separation nip region, a torque that exceeds a threshold is applied to the torque limiter. At this time, the torque limiter stops drive transmission of the torque, the reverse roller 70 is rotated in the document feeding direction with the document feeding belt 69 or the single original document MS.

By contrast, when the multiple original documents MS enter into the separation nip region, the adjacent layered original documents MS slip between each other, and therefore the torque value applied to the torque limiter becomes less than the threshold value. In response to the reduction of the torque value of the torque limiter, the driving force applied by the sheet feed motor 93 is transmitted to the reverse roller 70, so that the reverse roller 70 rotates in a direction opposite to the document feeding direction. By so doing, the uppermost sheet that is in direct contact with the document feeding belt 69 and a subsequent sheet of the bundle of original documents MS are separated from each other, and the reverse roller 70 returns the subsequent sheet of the bundle of original documents MS to the original document table 62. Consequently, the bundle of original documents MS are separated one by one in the separated document feeding part B and conveyed to perform a subsequent process.

The separated original document MS is further conveyed by the document feeding belt 69 in the document feeding direction. After a document contact sensor 71 of the registration part C has detected the leading edge of the separated original document MS, the original document MS abuts against a pair of pull-out rollers 72 that remains stopped.

When the document contact sensor 71 transmits the document detection signal to the ADF controller 99, the ADF controller 99 causes the pickup motor 92 to drive to rotate in the reverse direction, so that the pickup roller 67 leaves from the upper surface of the uppermost sheet of the bundle of original documents MS. By so doing, the separated single original document MS is conveyed by a conveying force applied by the document feeding belt 69. Then, after a given period of time from when the document detection signal is transmitted, the ADF controller 99 causes the sheet feed motor 93 to stop rotation in the forward direction. As a result, the original document MS with the leading edge thereof abutting against the pair of pull-out rollers 72 stops with a given bend while the document MS is being aligned to a correct posture without any skew (skew correction).

Then, the ADF controller 99 causes the sheet feed motor 93 to drive to rotate in the reverse direction, thereby rotate the pair of pull-out rollers 72 and an intermediate roller 74 of the turning part D. At this time, a driving force applied by the sheet feed motor 93 is not transmitted to the pickup roller 67 and the document feeding belt 69.

A document width sensor 73 that includes multiple original document sensors are arranged along the width direction, which is a direction perpendicular to the document feeding direction, of the original document MS. The document width sensor 73 detects the width size of the original document MS that is conveyed by the pair of pull-out rollers 72 in the width direction.

It is to be noted that the length (size) of the original document MS in the document feeding direction is calculated based on a time difference between detection timings of the leading edge and the trailing edge of the original document MS obtained by the document contact sensor 71 obtained by the document contact sensor 71.

When the document is conveyed from the registration part C to the turning part D as the pair of pull-out rollers 72 and the pair of intermediate rollers 74 rotate, a document conveyance speed of the original document MS at the registration part C is set faster than a conveyance speed of the original document MS at the first fixed scanning part E so as to reduce a processing time to convey the original document MS to the first fixed reading part E.

When the original document MS approaches the turning part D, the original document MS is turned while being reversed upside down in the turning part D. At this time, when a scan entrance sensor 75 that has detected the leading edge of the original document MS outputs the document detection signal, the ADF controller 99 changes the speed of conveyance of the original document MS at a timing before the leading edge of the original document MS enters a nip region formed by a pair of scan entrance rollers 76 of the first fixed scanning part E. Specifically, the speed of conveyance of the original document MS in the registration part C and the turning part D is adjusted to be the same as the speed of conveyance of the original document MS in the first fixed scanning part E. At the same time, the scan motor 94 is driven to rotate in the forward direction to rotate the pair of scan entrance rollers 76, a scan exit roller 83, and a CIS exit roller 87 in the document feeding direction.

Immediately after having passed a contact position with the pair of scan entrance rollers 76, the leading edge of the original document MS is detected by the registration sensor 77. When the registration sensor 77 transmits the document detection signal, the ADF controller 99 decelerate the speed of conveyance of the original document MS while moving the original document MS by a given distance, and temporarily stops the original document MS before a first side scanning position 80. At the same time, the ADF controller 99 transmits a registration stop signal to the apparatus controller 49 of the image forming apparatus 1 via the interface.

Consequently, when a scan start signal is transmitted from the apparatus controller 49, the original document MS that has been temporarily stopped for registration is conveyed with the speed of conveyance of the original document MS accelerated to gain a predetermined conveyance speed before the leading edge of the original document MS reaches the first side scanning position 80.

When the leading edge of the original document MS detected according to the pulse count of the scan motor 94 reaches the first side scanning position 80, a gate signal that indicates a valid image region in a sub-scanning direction of a first side of the original document MS is transmitted to the apparatus controller 49 until the trailing edge of the original document MS passes through the first side scanning position 80 completely. Thus, the first side of the image is scanned by the first fixed scanning part E of the scanner 150.

For the one-side reading mode, the original document MS that has passed the first fixed scanning part E is conveyed to the document discharging part G via the second fixed scanning part F without an image formed on the second side of the original document MS being scanned. At this time, after the document discharging sensor 84 has detected the leading edge of the original document MS and transmits the document detection signal to the ADF controller 99, the ADF controller 99 causes the document discharging motor 95 to drive a document discharging roller 88 in a document discharging direction.

Further, a timing immediately before the trailing edge of the original document MS passes by from the nip region formed between upper and lower rollers of a pair of document discharging rollers 88 is obtained according to the number of pulses of the document discharging motor 95 counted by the document discharging sensor 84 starting from the leading edge of the original document MS. When the timing comes, the driving speed of the document discharging motor 95 is decelerated, so that the original document MS to be discharged to a document discharging tray 89 cannot be placed projected therefrom.

For duplex reading, after the document discharging sensor 84 has detected the leading edge of the original document MS, a timing when the leading edge of the original document MS reaches the second fixed scanning part F is obtained according to the number of pulses of the document discharging motor 95 counted by the document discharging sensor 84. At this time, the ADF controller 99 starts to transmit a gate signal that indicates a valid image region in a sub-scanning direction of the original document MS to the second side scanning sensor 85. This transmission of the gate signal continues until the trailing edge of the original document MS passes through the second fixed scanning part F. By so doing, the back surface of the original document MS is scanned and read.

It is to be noted that a white color reference member 86 includes a white color part in order to scan and read a white color image that is used for establishing data for shading adjustment to scanning results of image data on the back surface of the original document MS scanned by the second side scanning sensor 85.

When the whole bundle of original documents MS loaded on the document setting part An are fed, the ADF controller 99 causes the bottom plate lift motor 96 to drive in the reverse direction to lower the movable original document table 63 to a home position for setting a subsequent bundle of original documents MS.

Figure 7:
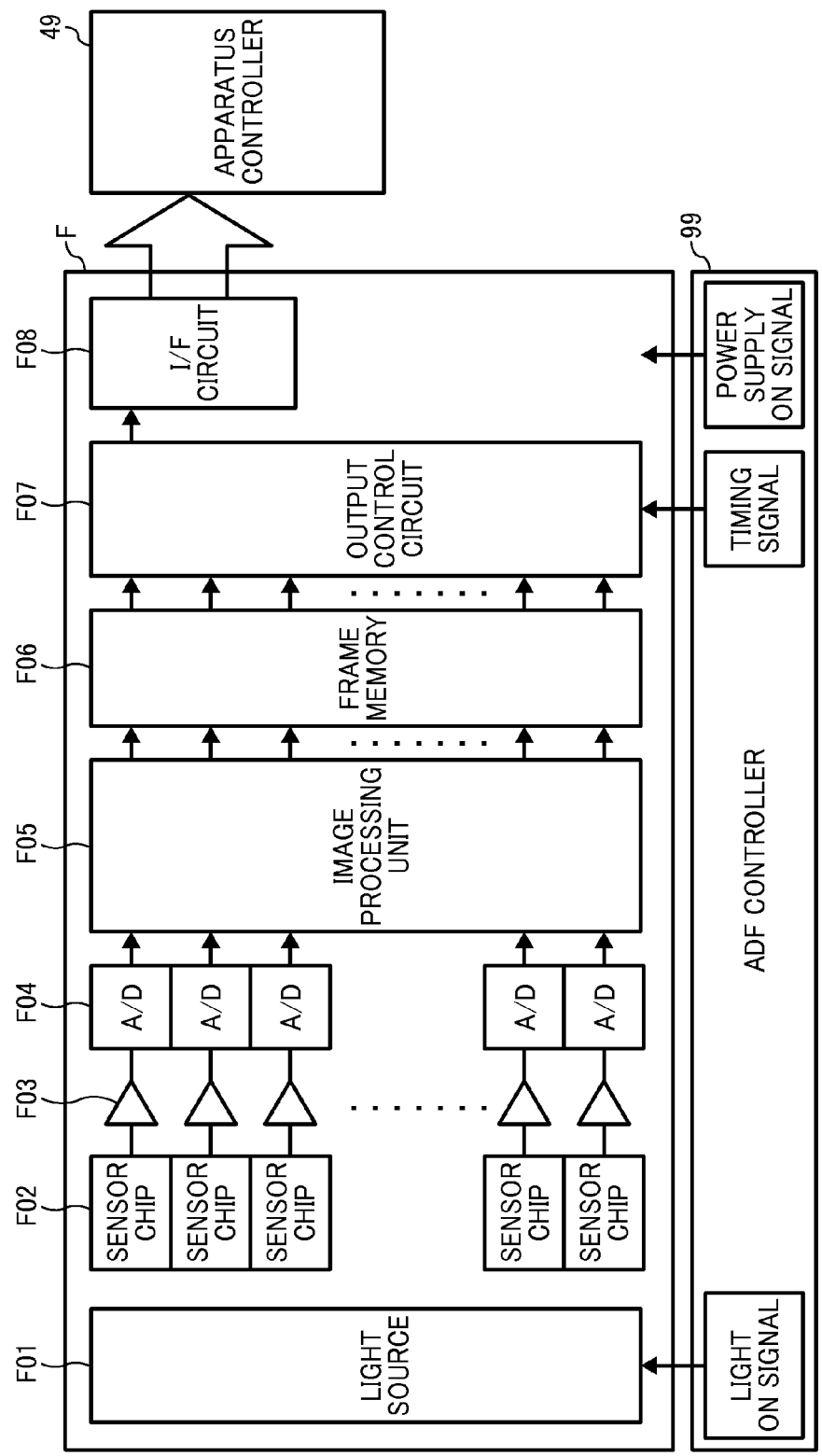
FIG. 7 is a block diagram illustrating part of electric circuit of a second face fixed reading part F in the ADF, a controller, and a main controller.

FIG. 7 is a block diagram illustrating part of electric circuit of the second fixed scanning part F connected to the ADF controller 99 and the apparatus controller 49.

In FIG. 7, the second fixed scanning part F includes a light source F01, multiple sensor chips F02, multiple operational (OP) amplifier circuits F03, multiple analog-to-digital (A/D) converters F04, an image processing unit F05, a frame memory F06, an output control circuit F07, and an interface (UF) circuit F08. The light source F01 can be a light emitting diode (LED) array, a fluorescent lamp, or a cold cathode tube. The multiple sensor chips F02 are arranged along a main scanning direction of the original document MS, which is a width direction of the original document MS. The multiple OP amplifier circuits F03 are individually connected to the corresponding sensor chips F02. The multiple A/D converters F04 are individually connected to the corresponding to the OP amplifier circuits F03.

Each of the multiple sensor chips F02 includes a photoelectric converting element that is called as an equal magnification contact image sensor and a condenser lens. Prior to entrance of the original document MS to a second side scanning position in the second fixed scanning part F, the ADF controller 99 transmits a light ON signal to the light source F01. On receipt of the light ON signal, the light source F01 is turned on to emit light toward the back surface of the original document MS. The light reflected on the back surface of the original document MS is collected by the condenser lens to the photoelectric converting element and is read as image data by the multiple sensor chips F02. The image data read by the respective sensor chips F02 is amplified by the multiple OP amplifier circuits F03, and then is converted to digital image data by the respective A/D converters F04. The digital image data is inputted to the image processing unit F05, adjusted by shading, and temporarily stored in the frame memory F06. After the output control circuit F07 has converted the digital data into a data format that can be received by the apparatus controller 49, the digital data is output to the apparatus controller 49 via the OF circuit F08.

It is to be noted that the ADF controller 99 outputs a timing signal, a light on signal, a power supply ON signal and so forth to inform a timing at which the leading edge of the original document MS reaches the second side scanning position in the second fixed scanning part F. Image data after the timing is considered as valid image data.

Mode information to set a copy mode of the image forming apparatus 1 to regular mode or silent mode can be inputted to the instruction input unit 48 of the image forming apparatus 1. In receipt of the mode information, the apparatus controller 49 sets the copy mode to the selected mode and transfers the updated copy mode to the ADF controller 99 of the ADF 51. When the updated copy mode is transmitted, the ADF controller 99 changes the setting according to the mode information with the copy mode.

When the copy mode is set to the regular mode, the apparatus controller 49 sets the speed of conveyance of a recording sheet in the sheet feeding device 40 and the image forming apparatus 1 to a given regular speed of conveyance. The apparatus controller 49 then drives various motors at respective speeds corresponding to the given regular speed of conveyance.

By contrast, when the copy mode is set to the silent mode, the apparatus controller 49 sets the speed of conveyance of a recording sheet in the sheet feeding device 40 and the image forming apparatus 1 to a speed of conveyance slower than the given regular speed of conveyance. According to this setting, a recording sheet is conveyed at a lower speed of conveyance than the given regular speed of conveyance in the silent mode. In other words, a low speed conveyance of a recording sheet is performed in the silent mode in the sheet feeding device 40 and the image forming apparatus 1. By so doing, occurrence of abnormal sound or noise can be prevented.

When the copy mode is set to the regular mode, the ADF controller 99 of the ADF 51 sets the speed of conveyance of the original document MS in the ADF 51 to a given regular speed of conveyance. The ADF controller 99 then drives various motors at respective speeds corresponding to the given regular speed of conveyance of the original document MS in the ADF 51. Consequently, the ADF 51 performs a high speed conveyance with respect to the original document MS therein.

By contrast, when the copy mode is set to the silent mode, the ADF controller 99 sets the speed of conveyance of the original document MS in the ADF 51 to a speed of conveyance slower than the given regular speed of conveyance. According to this setting, the original document MS is conveyed at a lower speed of conveyance than the given regular speed of conveyance in the silent mode. In other words, a low speed conveyance of the original document MS is performed in the silent mode in the ADF 51. By so doing, occurrence of abnormal sound or noise can be prevented.

In the above-described configuration, the image forming system 100 includes an image forming part 200, a sheet feeder 300, and a controller 400.

The image forming part 200 includes the optical writing unit 2, the image forming units 3K, 3Y, 3C, and 3M, and the transfer unit 24 so as to form an image forming part 200 to form a visible image on a recording sheet.

The sheet feeder 300 includes the sheet feeding device 40, the switchback unit 36, and the registration roller pair 33 so as to feed a recording sheet fed from a selected one of the sheet trays 42, which functions as a sheet container, to convey the image forming part 200.

The controller 400 includes the apparatus controller 49 and the ADF controller 99 so as to adjust conveyance of a recording sheet in the image forming part 200 and the sheet feeder 300 and conveyance of the original document MS in the ADF 51 that functions as a document feeder and switch both the conveyance of the recording sheet and the conveyance of the original document MS between the high speed conveyance and the low speed conveyance.

In a comparative image forming apparatus, it is difficult to prevent noise because a speed of conveyance of a recording sheet in the silent mode cannot be reduced sufficiently due to various limitations. For example, if the speed of conveyance of the recording sheet is reduced too much, the recording sheet cannot be separated preferably by a separation roller. This inconvenience can frequently cause multifeed in which multiple recording sheets are fed at one time. Further, a polygon mirror is rotated at a preferably high speed in order to ensure high precision in optical writing of respective electrophotographic latent images on the photoconductors, and then the recording sheet is conveyed at a speed of conveyance corresponding to the speed of rotation of the polygon mirror. Due to these limitations, the speed of conveyance of the recording sheet cannot be reduced significantly. Therefore, it is difficult to achieve a sufficiently effective noise reduction.

In address the above-described inconvenience, the apparatus controller 49 of the image forming system 100 changes operations when an image is continuously formed onto multiple recording sheets in a continuous copy mode and a continuous print mode. That is, the apparatus controller 49 adjusts a distance between the trailing edge of a preceding recording sheet and the leading edge of a subsequent recording sheet to be different between the regular mode and the silent mode. Specifically, the distance between the adjacent recording sheets (i.e., the preceding sheet and the subsequent sheet) in the silent mode is set greater than the distance between the adjacent recording sheets in the regular mode.

In the silent mode, when the distance between the adjacent recording sheets is greater than a given regular distance, the number of prints per unit time is smaller than the number of prints per unit time of the given regular distance. For example, in the setting of the speed of conveyance of a recording sheet to 134 mm/s and the distance between the adjacent recording sheets to 69 mm in the silent mode, when an A4-size recording sheet is conveyed in a lateral feed and the print job is executed, 28.8 recording sheets are printed per minute (60 min./((210 mm+69 mm)/134).

By contrast, in the silent mode, in the setting of the speed of conveyance of a recording sheet to 134 mm/s and the distance between the adjacent recording sheets to 192 mm in the silent mode, when an A4-size recording sheet is conveyed in a lateral feed and the print job is executed, 20 recording sheets are printed per minute, which is 8.8 recording sheets short compared to the setting of the distance between the adjacent recording sheets to 69 mm. A certain part of the sheet feeding device 40 and the image forming apparatus 1 generates extremely large noise while feeding a recording sheet. For example, in a sheet separating and feeding part such as the sheet feeding device 40 including the separation rollers 45, when one or more subsequent recording sheets separated from an uppermost recording sheet of multiple recording sheets fed from the selected one of the sheet trays 42 are returned to the selected sheet tray 42, sliding noise of the recording sheets is generated.

Accordingly, when the uppermost recording sheet passes by the separation roller 45, extremely large noise is generated.

Figure 8:
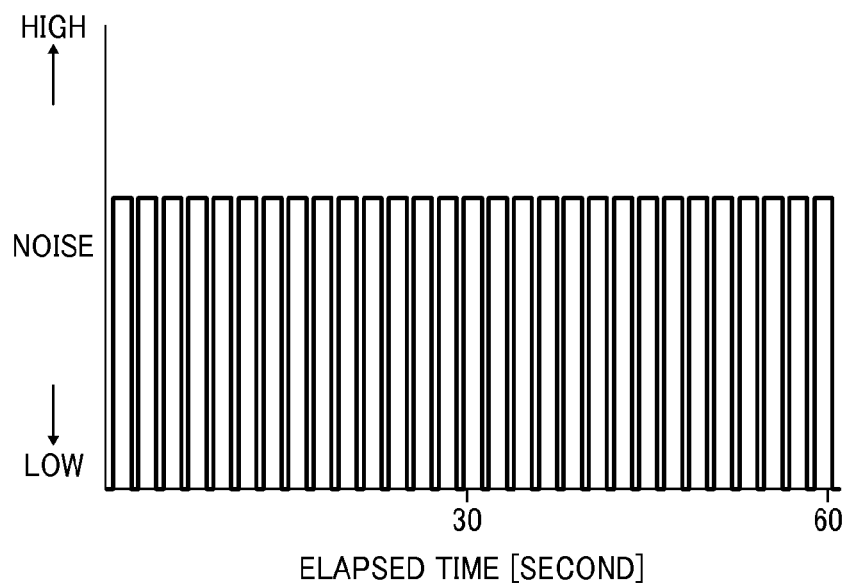
FIG. 8 is a graph showing a relation of a noise level and an elapsed time when multiple A4-size recording sheets are continuously conveyed horizontally by a sheet feeder or the image forming apparatus in the silent mode at a speed of conveyance of 134 mm/s with a distance of 69 mm between adjacent recording sheets of the multiple A4-size recording sheets.

FIG. 8 is a graph showing a relation between noise level and elapsed time when multiple A4-size recording sheets are continuously conveyed in a direction of the lateral feed under the settings of the speed of conveyance of 134 mm/s and the distance of adjacent recording sheets of 69 mm in the silent mode in the sheet feeding device 40 and the image forming apparatus 1.

In the graph of FIG. 8, a cycle of large noise waves having a rectangular pulse shape occurs along with a deriving action of the sheet separating and feeding part. According to the graph of FIG. 8, 28.8 noise waves per minute are generated. The cumulative total volume of noise per minute is equal to the sum of areas of these noise waves.

Figure 9:
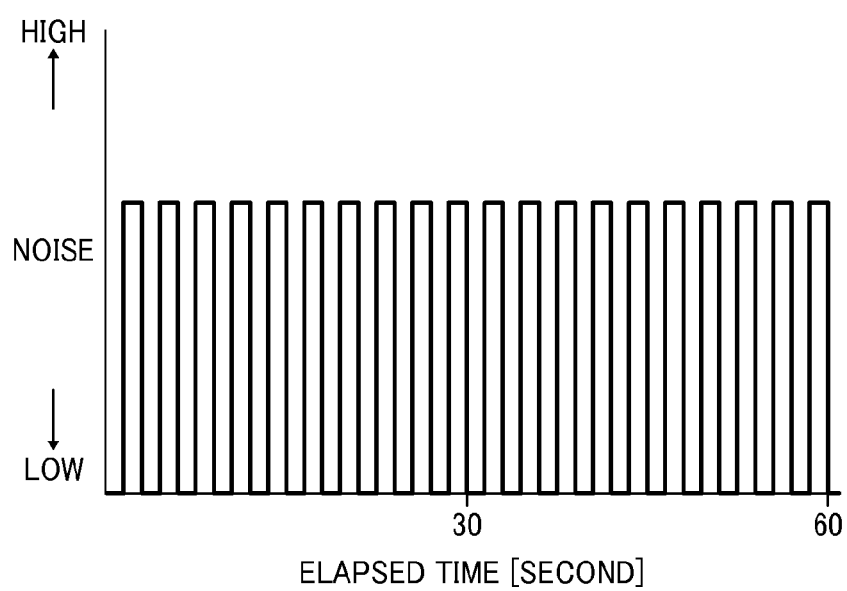
FIG. 9 is a graph showing a relation of a noise level and an elapsed time when multiple A4-size recording sheets are continuously conveyed horizontally by a sheet feeder or the image forming apparatus in the silent mode at a speed of conveyance of 134 mm/s with a distance of 192 mm between adjacent recording sheets of the multiple A4-size recording sheets.

FIG. 9 is a graph showing a relation between noise level and elapsed time when multiple A4-size recording sheets are continuously conveyed in a direction of the lateral feed under the settings of the speed of conveyance of 134 mm/s and the distance of adjacent recording sheets of 192 mm in the silent mode in the sheet feeding device 40 and the image forming apparatus 1. The height of the noise waves is identical to the height of the noise waves illustrated in FIG. 8 and the number of noise waves generated per minute is reduced to 20 noise waves from 28.8 noise waves of FIG. 8. By so doing, the cumulative total volume of noise per minute is significantly reduced compared with the cumulative total volume of noise per minute under the settings of FIG. 8.

As described above, even though multiple recording sheets of different distances of adjacent recording sheets are conveyed at the same speed of conveyance in the low speed conveyance, the total volume of noise per minute of the multiple recording sheets having the distance of 192 mm between the adjacent recording sheets is reduced more than the total volume of noise per minute of the multiple recording sheets having the distance of 69 mm between the adjacent recording sheets.

Based on the above-described results, the apparatus controller 49 increases the distance between the adjacent recording sheets in the silent mode to be greater than the distance between the adjacent recording sheets in the regular mode. By so doing, generation of noise can be prevented when the recording sheets are continuously conveyed in the low speed conveyance in the silent mode in the image forming apparatus 1 according to an example of this disclosure, when compared with the comparative image forming apparatus in which the distance between the adjacent recording sheets is set same as in the silent mode and the regular mode.

Next, a description is given of another configuration of the image forming system 100 according to an example of this disclosure.

Unless otherwise specified below, the configuration of the image forming system 100 according to the present example of this disclosure is the same as the above-described configuration of the image forming system 100.

Table 1 shows various conditions in the regular mode and the silent mode selectable in the image forming system 100 according to the present example of this disclosure.

TABLE 1

| | Printer and Sheet Feeder | | | |
|---|---|---|---|---|
| Mode | Speed of Conveyance [mm/s] | Silent-to-Regular Ratio [%] | Distance between Sheets [mm] | Number of Outputs of A4 Landscape Sheets [sheets/min.] |
| Regular | 186 | 100 | 69 | 40 |
| Silent | 134 | 72 | 192 | 20 |

| | ADF | | | |
|---|---|---|---|---|
| Mode | Speed of Conveyance [mm/s] | Silent-to-Regular Ratio [%] | Distance between Documents [mm] | Number of Scans of A4 Landscape Sheets [sheets/min.] |
| Regular | 226 | 100 | 129 | 40 |
| Silent | 117 | 51.8 | 141 | 20 |

The speed of conveyance of the original document MS in the regular mode in the ADF 51 is set to be greater than the speed of conveyance of a recording sheet in the regular mode in the image forming apparatus 1 and the sheet feeding device 40. This setting is based on the fact that the ADF 51 is an optional product that is commonly used for several printer models, and therefore the specification of the ADF 51 is determined according to the selected printer model without dedicating the speed of conveyance of the original document MS to a specific single printer model. Even though the speed of conveyance of the original document MS in the regular mode in the ADF 51 is different from the speed of conveyance of a recording sheet in the regular mode in the image forming apparatus 1 and the sheet feeding device 40, the productivity per minute of the ADF 51 is the same as the productivity per minute of the image forming apparatus 1 and the sheet feeding device 40. To be more specific, the number of prints per minute is 40 sheets when multiple A4-size recording sheets are continuously conveyed in the direction of the lateral feed in the image forming apparatus 1 and the sheet feeding device 40. The number of scans per minute is also 40 documents when multiple A4-size original documents MS are continuously conveyed in the direction of the lateral feed in the ADF 51. In order to achieve the effect to obtain the same productivity as described above, the distance between the recording sheets is set to 69 mm and the distance between the original documents MS is set to 129 mm.

If achievement of the same productivity is not considered, the number of scans of the original documents MS conveyed in the high speed conveyance in the ADF 51 generally exceeds the number of prints of the recording sheets conveyed in the low speed conveyance in the image forming apparatus 1 and the sheet feeding device 40. Consequently, when the data buffer of the ADF 51 becomes full, the scanning operation of the ADF 51 is temporarily stopped. Then, when the data buffer of the ADF 51 obtains some rooms for new input data, the ADF 51 restarts the scanning operation of the original documents MS. If the scanning operation of the ADF 51 is temporarily stopped and is restarted repeatedly, energy consumption in the ADF 51 and the image forming system 100 is increased.

By contrast, when the image forming system 100 according to the present example of this disclosure performs operations in the regular mode, the productivity of the ADF 51 is the same as the productivity of the image forming apparatus 1 and the sheet feeding device 40. By so doing, the repetition of temporary stops and restarts of the ADF 51 can be prevented. As a result, the energy consumption due to the repetition can be avoided.

As shown in Table 1, the ADF 51 reduces the speed of conveyance of the original document MS in the silent mode, which is 117 mm/s, to 51.8% of the speed of conveyance of the original document MS in the regular mode, which is 226 mm/s. In addition, the ADF 51 increases the distance between the original documents MS in the silent mode than in the regular mode. Due to the synergy effect, noise generated in the ADF 51 can be reduced to a sufficient level in the silent mode.

By contrast, some limitations makes it difficult to reduce the speed of conveyance of a recording sheet in the sheet feeding device 40 and the image forming apparatus 1. Due to the limitations, as shown in Table 1, the sheet feeding device 40 and the image forming apparatus 1 cannot reduce the speed of conveyance of the recording sheet in the silent mode, which is 134 mm/s, to 72% of the speed of conveyance of the recording sheet in the regular mode, which is 186 mm/s. By maintaining the above-described reduction rate, occurrence of multifeed in the sheet separating and feeding part can be prevented and frequency of occurrence of noise due to an increase in speed of rotation of the polygon mirror can be reduced.

Specifically, the optical writing unit 2 of the image forming apparatus 1 generates two laser light beams L are generated for each of black (K), yellow (Y), cyan (C), and magenta (M) colors, so that two lines in the main scanning direction of a recording sheet can be optically scanned simultaneously. This optical scanning is referred to as a dual beam scanning method.

If the high precision is maintained in optical writing to keep the speed of rotation of the polygon mirror in a certain high speed and the speed of conveyance of the recording medium is reduced by lowering the optical scanning efficiency, a single beam scanning method can be employed instead of the dual beam scanning method. When the single beam scanning method is employed, if the polygon mirror is rotated at a regular speed of rotation, the optical scanning of the original documents MS is performed behind the speed of conveyance of the recording sheets. Therefore, the speed of rotation of the polygon mirror is increased so that the optical scanning can catch up the speed of conveyance of the recording sheets. This operation increases frequency of occurrence of noise.

In order to address this inconvenience, the increase in occurrence of the above-described noise can be prevented by retaining a reduction rate of the speed of conveyance (a rate of change of speed) of the recording sheets in the silent mode to 72%, which is lower than a reduction rate of the speed of conveyance (a rate of change of speed) of the original documents MS.

However, if the increase in occurrence of the noise is prevented, noise generated by the sheet feeding device 40 and the image forming apparatus 1 cannot be reduced to a sufficient level.

In order to address this inconvenience, the distance between the recording sheets in the silent mode, which is 192 mm, is significantly increased than the distance between the recording sheets in the regular mode, which is 69 mm. Consequently, in comparison with a case in which the distance between the recording sheets is not increased, the productivity of the sheet feeding device 40 and the image forming apparatus 1 per unit time is reduced. Therefore, the noise generated by the sheet feeding device 40 and the image forming apparatus 1 can be reduced to a desired level.

It is to be noted that as shown in Table 1, the productivity of the ADF 51 in the silent mode is the same as the productivity of the image forming apparatus 1 and the sheet feeding device 40 in the silent mode. Therefore, by sequentially operating the ADF 51, the sheet feeding device 40, and the image forming apparatus 1, the energy consumption due to the repetition of temporary stops and restarts can be avoided.

In order to obtain the productivity of the ADF 51 in the silent mode that is same as the productivity of the sheet feeding device 40 and the image forming apparatus 1 in the silent mode, the ADF 51 of the image forming system 100 according to the present example of this disclosure has different distances between the original documents MS in the regular mode and in the silent mode.

As described above, by adjusting the productivity of the ADF 51 and the productivity of the sheet feeding device 40 and the image forming apparatus 1, noise that is generated in the silent mode can be reduced to 63 [dBA].

Next, a description is given of yet another configuration of the image forming system 100 according to an example of this disclosure.

Unless otherwise specified below, the configuration of the image forming system 100 according to the present example of this disclosure is the same as the above-described configuration of the image forming system 100.

In the image forming system 100 according to the present example of this disclosure, the productivity of the image forming apparatus 1 in a one-side printing mode is reduced to 60% of the productivity in a duplex printing mode. Specifically, when the duplex printing is performed in the silent mode in the image forming system 100 according to the present example of this disclosure, the number of prints per minute is reduced to 12 recording sheets when multiple A4-size recording sheets are conveyed in the direction of the lateral feed in the image forming apparatus 1 and the sheet feeding device 40. By contrast, the number of scans per minute is 20 original documents MS when multiple A4-size recording sheets are conveyed in the direction of the lateral feed in the ADF 51 in the silent mode. Specifically, when the duplex printing mode is performed in the silent mode, the productivity of the sheet feeding device 40 and the image forming apparatus 1 reduces lower than the productivity of the ADF 51.

In order to address this inconvenience, the apparatus controller 49 of the image forming system 100 adjusts the distance between recording sheets when the duplex printing is performed in the silent mode to be smaller than the distance between recording sheets when the one-side printing is performed in the silent mode.

Table 2 shows various conditions in the silent mode and the silent mode selectable in the image forming system 100 according to the present example of this disclosure.

TABLE 2

| | Printer and Sheet Feeder | | |
|---|---|---|---|
| Mode | Speed of Conveyance [mm/s] | Distance between Sheets [mm] | Number of Outputs of A4 Landscape Sheets [sheets/min.] |
| Silent and One-side Printing | 134 | 192 | 20 |
| Silent and Duplex Printing | 134 | 31 | 20 (33.33 sheets × 0.6) |

| | ADF | | |
|---|---|---|---|
| Mode | Speed of Conveyance [mm/s] | Distance between Documents [mm] | Number of Scans of A4 Landscape Sheets [sheets/min.] |
| Silent and One-side Printing | 117 | 141 | 20 |
| Silent and Duplex Printing | 117 | 141 | 20 |

Both when the recording sheet is printed in the one-side printing mode in the silent mode and when the recording sheet is printed in the duplex printing mode in the silent mode, the speed of conveyance of a recording sheet is 134 mm/s, so that the reduction rate of the speed of conveyance of the recording sheet is retained to 72% in the regular mode.

However, the distance between the recording sheets is significantly different between these cases. Specifically, the distance between the recording sheets when the duplex printing is performed in the silent mode is set to 31 mm, which is significantly smaller than the distance between the recording sheets when the one-side printing is performed in the silent mode, which is 192 mm. Due to the above-described settings, even though the speed of conveyance of the recording sheets in the one-side printing mode in the silent mode is the same as the speed of conveyance of the recording sheets in the duplex printing mode in the silent mode, the productivity is enhanced in printing each side of the recording sheet in the duplex printing mode. By enhancing the productivity of each side in the duplex printing mode, the total productivity in the duplex printing mode can achieve 20 sheets per minute, which is the same as the productivity in the one-side printing mode. Consequently, even when the duplex printing is performed in the silent mode, the ADF 51, the sheet feeding device 40, and the image forming apparatus 1 have an identical productivity. By so doing, the energy consumption due to the repetition of temporary stops and restarts can be avoided.

FIG. 10 is a flowchart showing a series of setting operations performed by the controller 400 according to an example of this disclosure, including the apparatus controller 49 of the image forming system 100 and the ADF controller 99 of the ADF 51.

When the setting operations are started, the controller 400 determines whether an operation mode specified by a user is the regular mode or the silent mode in step S1.

When the operation mode is the regular mode (YES in step S1), the controller 400 sets the speed of conveyance of the original documents MS, the speed of conveyance of recording sheets, the distance between the recording sheets, and the distance between the original documents MS for the regular mode in step S2. Specifically, the speed of conveyance of the original documents MS in the ADF 51 is set to A and the distance between the original documents MS in the ADF 51 is set to a. Further, the speed of conveyance of the recording sheets in the image forming apparatus 1 and the sheet feeding device 40 is set to B (B<A) and the distance between the recording sheets in the image forming apparatus 1 and the sheet feeding device 40 is set to b.

When the operation mode is not the regular mode but is the silent mode (NO in step S1), the controller 400 sets the speed of conveyance of the original documents MS, the speed of conveyance of recording sheets, the distance between the recording sheets, and the distance between the original documents MS for the silent mode in steps S3 and S4. Specifically, the speed of conveyance of the original documents MS for the one side printing mode in the ADF 51 is set to A×0.518 and the distance between the original documents MS for the one side printing mode in the ADF 51 is set to a+a'. Then, the speed of conveyance of the recording sheets for the one side printing mode in the image forming apparatus 1 and the sheet feeding device 40 is set to B×0.72 and the distance between the recording sheets for the one side printing mode in the image forming apparatus 1 and the sheet feeding device 40 is set to b+b'.

Further, the speed of conveyance of the original documents MS for the duplex printing mode in the ADF 51 is set to A×0.518 and the distance between the original documents MS for the duplex printing mode in the ADF 51 is set to a+a'. Then, the speed of conveyance of the recording sheets for the duplex printing mode in the image forming apparatus 1 and the sheet feeding device 40 is set to B×0.72 and the distance between the recording sheets for the duplex printing mode in the image forming apparatus 1 and the sheet feeding device 40 is set to b-b".

In the configurations according to the examples of this disclosure, when a recording sheet is conveyed in the low speed sheet conveyance, the distance between recording sheets is set greater than in the high speed sheet conveyance, and therefore the number of recording sheets conveyed per unit time is increased. Consequently, by reducing the total volume of noise per unit time generated along with the sheet conveying operation, generation of noise can be more prevented than before.

Further, in the configurations according to the examples of this disclosure, the controller (for example, the controller 400) switches speeds of conveyance of the original document (for example, the original document MS) fed by the document feeder (for example, the ADF 51) between the high speed document conveyance and the low speed document conveyance, the document feeder continuously feeds multiple original documents in a continuous feeding mode, and the controller adjusts a distance between a trailing end of a preceding original document of the multiple original documents and a leading end of a subsequent original document of the multiple original documents in the continuous feeding mode in the low speed document conveyance to be greater than the distance therebetween in the high speed document conveyance. Accordingly, the distance between original documents is set greater when the original documents are conveyed in the low speed document conveyance in the document feeder, and therefore frequency or level of generation of noise can be smaller.

Further, in the configurations according to the examples of this disclosure, the controller (for example, the controller 400) switches speeds of conveyance of the original document (for example, the original document MS) fed by the document feeder (for example, the ADF 51) between the high speed document conveyance and the low speed document conveyance, causes the high speed sheet conveyance by the image forming apparatus (for example, the image forming apparatus 1) and the high speed document conveyance by the document feeder to perform simultaneously during a copying operation, and causes the low speed sheet conveyance by the image forming apparatus and the low speed document conveyance by the document feeder to perform simultaneously during the copying operation. Accordingly, when multiple recording sheets are conveyed by the document feeder for printing in the continuous printing mode, the image forming apparatus and the document feeder can operate together in the silent mode (the low speed sheet conveyance mode or the low speed document conveyance mode) or in the regular mode (the high speed sheet conveyance mode or the high speed document conveyance mode).

Further, in the configurations according to the examples of this disclosure, a rate of change of speed between the high speed sheet conveyance and the low speed sheet conveyance of the recording sheet in the image forming apparatus (for example, the image forming apparatus 1) is lower than a rate of change of speed between the high speed document conveyance and the low speed document conveyance of the original document (for example, the original document MS) in the document feeder (for example, the ADF 51). Accordingly, the rate of change of speed in the high speed sheet conveyance and the low speed sheet conveyance in the image forming apparatus that cannot reduce the speed of conveyance of the recording sheet is set smaller than the rate of change of speed in the high speed document conveyance and the low speed document conveyance in the document feeder that can reduce the speed of conveyance of the original document. Therefore, even if the speed of conveyance of the recording sheet is reduced too much in the low speed sheet conveyance mode in the image forming apparatus, occurrence of multifeed in the sheet separating and feeding part due to the reduction of the speed of conveyance of the recording sheet can be prevented and frequency of occurrence of noise can be reduced.

Further, as described above, if the image forming apparatus (for example, the image forming apparatus 1) and the sheet feeder (for example, the ADF 51) do not have the same productivity, temporary stops and restarts thereof are repeated. However, as described in the configurations according to the examples of this disclosure, the image forming apparatus (for example, the image forming apparatus 1) and the sheet feeder (for example, the ADF 51) have the same productivity, and therefore the energy consumption due to such repetition of temporary stops and restarts of one of the image forming apparatus and the sheet feeder can be avoided.

Further, as described above, the image forming apparatus (for example, the image forming apparatus 1) includes a re-conveying unit (for example, the switchback unit 36) to convey the recording sheet while reversing the front surface of the recording sheet to the back surface thereof so that the recording sheet enters the image forming part again such that a second image is formed on the back surface of the recording medium after a first image is formed on the front surface thereof in the image forming part (for example, the image forming part 200). In addition, the distance between the recording sheets when the duplex printing is performed in the silent mode is adjusted to be smaller than the distance between recording sheets when the one-side printing is performed in the silent mode. Accordingly, in the configurations according to the examples of this disclosure, due to the adjustment of the distance between the recording sheets, the productivity of prints on the recording sheets in the duplex printing mode in the low speed sheet conveyance and the productivity thereof in the one-side printing mode in the low speed sheet conveyance can be set individually and flexibly.

Further, as described above, in the configurations according to the examples of this disclosure, the controller (for example, the controller 400) adjusts such that the printing distance in the duplex printing mode in the low speed sheet conveyance is smaller than the printing distance in the one-side printing mode in the low speed sheet conveyance. Accordingly, the productivity of the image forming apparatus (for example, the image forming apparatus 1) and the sheet feeder (for example, the sheet feeding device 40) in the low speed conveyance in the duplex printing mode can be closer to or the same as the productivity of the image forming apparatus and the sheet feeder in the low speed conveyance in the one-side printing mode.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image forming system comprising:
an image forming apparatus including,
   a photoconductor on which toner images are to be developed,
   an intermediate transfer belt configured to receive the toner images,
   a sheet transfer belt configured to convey multiple recording mediums such that the toner images are transferred from the intermediate transfer belt onto the recording mediums,
   a sheet container configured to contain the recording mediums therein,
   a sheet feeder configured to feed the recording mediums from the sheet container toward the sheet transfer belt, and a controller configured to switch speeds of conveyance of the recording mediums conveyed by the sheet transfer belt and the sheet feeder between high speed sheet conveyance and low speed sheet conveyance, the image forming apparatus being configured to continuously transfer the toner images onto the multiple recording mediums in a continuous printing mode, the controller being configured to adjust a printing distance to be greater in the low speed sheet conveyance than in the high speed sheet conveyance, the printing distance being a distance between a trailing end of a preceding recording medium of the multiple recording mediums and a leading end of a subsequent recording medium of the multiple recording mediums;

an image reader configured to read image data on a sheet-type original document; and a document feeder configured to feed the sheet-type original document to the image reader, wherein the controller is further configured to switch speeds of conveyance of the sheet-type original document fed by the document feeder between high speed document conveyance and low speed document conveyance, wherein the document feeder is configured to continuously feed multiple sheet-type original documents in a continuous feeding mode, and wherein the controller is further configured to adjust a feeding distance in the continuous feeding mode to be greater in the low speed document conveyance than in the high speed document conveyance, the feeding distance being a distance between a trailing end of a preceding original document of the multiple original documents and a leading end of a subsequent original document of the multiple original documents.

2. The image forming system according to claim 1, wherein the controller is configured such that a rate of change of speed between the high speed sheet conveyance and the low speed sheet conveyance of the recording medium in the image forming apparatus is lower than a rate of change of speed between the high speed document conveyance and the low speed document conveyance of the original document in the document feeder.

3. The image forming system according to claim 1, wherein the controller is further configured to adjust the printing distance in the low speed sheet conveyance in the image forming apparatus such that a number of original documents per unit time when the multiple original documents are continuously conveyed by the document feeder in the low speed document conveyance is equal to a number of prints per unit time when the recording media are continuously conveyed by the image forming apparatus in the low speed sheet conveyance.

4. The image forming system according to claim 1,
wherein the image forming apparatus further includes a switchback unit configured to convey the multiple recording mediums while reversing first surfaces of the multiple recording mediums to second surface of the multiple recording mediums to enter the multiple recording mediums to the sheet transfer belt again such that second images are formed on the second surfaces of the multiple recording mediums after first images are formed on the first surfaces of the multiple recording mediums, wherein the controller is further configured to adjust the printing distance in the low speed sheet conveyance in a duplex printing mode in which both the first surfaces and the second surfaces of the multiple recording mediums are printed to be different from the printing distance in the low speed sheet conveyance in a one-side printing mode in which one of the first surfaces and the second surfaces of the multiple recording mediums are printed.

5. The image forming system according to claim 4, wherein the controller is further configured to adjust the printing distance to be smaller in the duplex printing mode in the low speed sheet conveyance than in the one-side printing mode in the low speed sheet conveyance.

6. The image forming system according to claim 1, wherein the controller is further configured to adjust the printing distance in the low speed sheet conveyance such that a number of prints per unit time in the low speed sheet conveyance is half of a number of prints per unit time in the high speed sheet conveyance.

7. The image forming system according to claim 1, wherein the image forming system is configured such that noise generated in the low speed document conveyance in the continuous feeding mode and in the low speed sheet conveyance in the continuous printing mode is 63 [dBA] or smaller.

8. An image forming system comprising:
an image forming apparatus including,
a photoconductor on which toner images are to be developed,
an intermediate transfer belt configured to receive the toner images,
a sheet transfer belt configured to convey multiple recording mediums such that the toner images are transferred from the intermediate transfer belt onto the recording mediums,
a sheet container to contain the recording mediums therein,
a sheet feeder to feed the recording mediums from the sheet container toward the sheet transfer belt, and
a controller configured to switch speeds of conveyance of the recording mediums conveyed by the sheet transfer belt and the sheet feeder between high speed sheet conveyance and low speed sheet conveyance,
the image forming apparatus being configured to continuously transfer the toner images onto the multiple recording mediums in a continuous printing mode,
the controller being configured to adjust a printing distance to be greater in the low speed sheet conveyance than in the high speed sheet conveyance, the printing distance being a distance between a trailing end of a preceding recording medium of the multiple recording mediums and a leading end of a subsequent recording medium of the multiple recording mediums;
an image reader configured to read image data on a sheet-type original document; and
a document feeder configured to feed the sheet-type original document to the image reader,
wherein the controller is further configured to,
switch speeds of conveyance of the sheet-type original document fed by the document feeder between high speed document conveyance and low speed document conveyance,
causes the high speed sheet conveyance by the image forming apparatus and the high speed document conveyance by the document feeder to perform simultaneously during a copying operation, and
causes the low speed sheet conveyance by the image forming apparatus and the low speed document conveyance by the document feeder to perform simultaneously during the copying operation.

9. An image forming apparatus comprising:
a photoconductor on which toner images are to be developed;
an intermediate transfer belt configured to receive the toner images;
a sheet transfer belt configured to convey multiple recording mediums such that the toner images are transferred from the intermediate transfer belt onto the recording mediums;
a sheet container to contain the recording mediums therein;
a sheet feeder to feed the recording mediums from the sheet container toward the sheet transfer belt; and
a controller configured to switch speeds of conveyance of the recording mediums conveyed by the sheet transfer belt and the sheet feeder between high speed sheet conveyance and low speed sheet conveyance;
the image forming apparatus being configured to continuously transfer the toner images onto the multiple recording mediums in a continuous printing mode;
the controller being configured to adjust a printing distance to be greater in the low speed sheet conveyance than in the high speed sheet conveyance, the printing distance being a distance between a trailing end of a preceding recording medium of the multiple recording mediums and a leading end of a subsequent recording medium of the multiple recording mediums,
wherein an image reader to read image data on a sheet-type original document and a document feeder to feed the sheet-type original document to the image reader are connected to the image forming apparatus,
wherein the controller is further configured to switch speeds of conveyance of the sheet-type original document fed by the document feeder between high speed document conveyance and low speed document conveyance,
wherein the document feeder is configured to continuously feeds multiple sheet-type original documents in a continuous feeding mode, and
wherein the controller is configured to adjusts a feeding distance to be greater in the low speed document conveyance than in the high speed document conveyance, the feeding distance being a distance between a trailing end of a preceding original document of the multiple original documents and a leading end of a subsequent original document of the multiple original documents.

10. The image forming apparatus according to claim 9, wherein the controller is further configured to,
causes the high speed sheet conveyance by the image forming apparatus and the high speed document conveyance by the document feeder to perform simultaneously during a copying operation, and
causes the low speed sheet conveyance by the image forming apparatus and the low speed document conveyance by the document feeder to perform simultaneously during the copying operation.

11. The image forming apparatus according to claim 9, wherein the controller is configured such that a rate of change of speed between the high speed sheet conveyance and the low speed sheet conveyance of the recording medium is lower than a rate of change of speed between the high speed document conveyance and the low speed document conveyance of the original document in the document feeder.

12. The image forming apparatus according to claim 9, wherein the controller is further configured to adjust the printing distance in the low speed sheet conveyance in the image forming apparatus such that a number of original documents per unit time when the multiple original documents are continuously conveyed by the document feeder in the low speed document conveyance is equal to a number of prints per unit time when the recording media are continuously conveyed by the image forming apparatus in the low speed sheet conveyance.

13. The image forming apparatus according to claim 9, further comprising:
a switchback unit configured to convey the multiple recording mediums while reversing first surfaces of the multiple recording mediums to a second surfaces of the multiple recording mediums to feed the multiple recording mediums towards the sheet transfer belt again such that second images are formed on the second surfaces of the multiple recording mediums after first images are formed on the first surfaces of the multiple recording mediums,
wherein the controller is further configured to adjusts the printing distance to be different in the low speed sheet conveyance in a duplex printing mode in which both the first surfaces and the second surfaces of the multiple recording mediums are printed than in the low speed sheet conveyance in a one-side printing mode in which one of the first surfaces and the second surfaces of the multiple recording mediums are printed,
wherein the controller is further configured to adjust the printing distance to be smaller in the duplex printing mode in the low speed sheet conveyance than in the one-side printing mode in the low speed sheet conveyance.

14. The image forming apparatus according to claim 9, wherein the controller is further configured to adjust the printing distance in the low speed sheet conveyance such that a number of prints per unit time in the low speed sheet conveyance is half of a number of prints per unit time in the high speed sheet conveyance.

15. The image forming apparatus according to claim 9, wherein the image forming apparatus is configured such that noise generated in the low speed document conveyance in the continuous feeding mode and in the low speed sheet conveyance in the continuous printing mode is 63 [dBA] or smaller.

* * * * *